Nov. 20, 1945.    J. M. ANDERSON    2,389,400
LOCKING MECHANISM FOR ELECTRIC SWITCHES
Filed June 30, 1942    5 Sheets-Sheet 1

Inventor:
James M. Anderson,
by Harry E. Dunham
His Attorney.

Patented Nov. 20, 1945

2,389,400

UNITED STATES PATENT OFFICE 2,389,400

LOCKING MECHANISM FOR ELECTRIC SWITCHES

James M. Anderson, Broomall, Pa., assignor to General Electric Company, a corporation of New York Application June 30, 1942, Serial No. 449,060

16 Claims. (Cl. 200—89)

My invention relates to improvements in locking mechanisms for electric switches and more particularly for trip-free circuit breakers which operate automatically in response to abnormal circuit conditions to interrupt a circuit and whose operation, under certain emergencies, must be prevented even during the existence of an abnormal circuit condition and, also, in consequence of shocks, vibrations, and the like.

In certain applications of automatic circuit breakers, crucial moments arise when it becomes absolutely necessary that the circuit breakers remain closed, especially under shocks, and often even though operating under the abnormal circuit conditions which would normally require a circuit opening operation. Sometimes, it is equally important to prevent an undesired circuit closing operation in consequence of shocks, as well as heedless closing on the part of the operator. Also, at times, it must be possible to close a circuit breaker under abnormal circuit conditions and keep it closed. If abnormal circuit conditions occur while a circuit breaker is locked against opening, then the locking action must be such that the circuit breaker mechanism cannot be released to a point where the circuit breaker could open slowly on subsequent release of the locking action. For convenience and simplicity of operation, it is desirable to have a single operating member by which all locking and hand tripping functions can be performed and particularly without requiring the continued presence of the operator. It is also important to have a dependable indicating means which will readily show the stage of the locking action.

An object of my invention is to provide means adapted to be operated to lock an electric switch, and especially an automatic circuit breaker, in the closed circuit position so that it cannot open in consequence of abnormal circuit conditions or because of shock, or both. Another object of my invention is to provide means adapted to be operated to lock the tripping mechanism of an electric switch, and especially an automatic circuit breaker, so that the switch can be closed under abnormal circuit conditions and remain closed at the will of the operator. Still another object of my invention is to provide means adapted to be operated to lock an electric switch, and especially an automatic circuit breaker, in the closed circuit position so that upon release of the locking action the switch will not open slowly in the event that abnormal circuit conditions occurred while the switch was locked. A further object of my invention is to provide means adapted to be operated to lock an electric switch, and especially an automatic circuit breaker, in the open circuit position so that it cannot be closed either heedlessly or by shock. A still further object of my invention is to provide a locking means which can be applied to circuit breakers previously installed and still in service. Also, an object of my invention is to provide a locking and tripping mechanism in which all the functions of locking and manual tripping can be accomplished by the manipulation of one operating member and without any necessity for the continued presence of the operator to maintain the locking features. Also, a further object of my invention is to provide means for positively indicating the stage of the locking action. These and other objects of my invention will appear in more detail hereinafter.

In accordance with my invention, I provide for an electric switch, and particularly an automatic circuit breaker, a locking mechanism comprising an operating member which can be moved in one direction through a plurality of positions to lock the switch in the closed circuit position against automatic tripping and, also, against opening due to shock and to lock the switch in the open circuit position against heedless closing or by shock, all without requiring the continued presence of the operator. Also, in accordance with my invention, I provide a locking mechanism which in the locking positions does not permit enough movement of the switch parts in consequence of shock or attempts at automatic tripping while the switch is closed to permit a slow opening of the switch mechanism when the locking action is released by a reverse movement of the lock-operating member. Further in accordance with my invention, I provide a locking mechanism in which another predetermined movement of the operating member will effect the opening of the switch when the locking actions are released. Also, in accordance with my invention, I provide an indicating means responsive to the movement of the operating member through its plurality of positions for positively indicating each locking action.

My invention will be better understood from the following description when considered in connection with the accompanying five sheets of drawings, and its scope will be pointed out in the appended claims.

In the accompanying drawings.

Figures 1, 6:
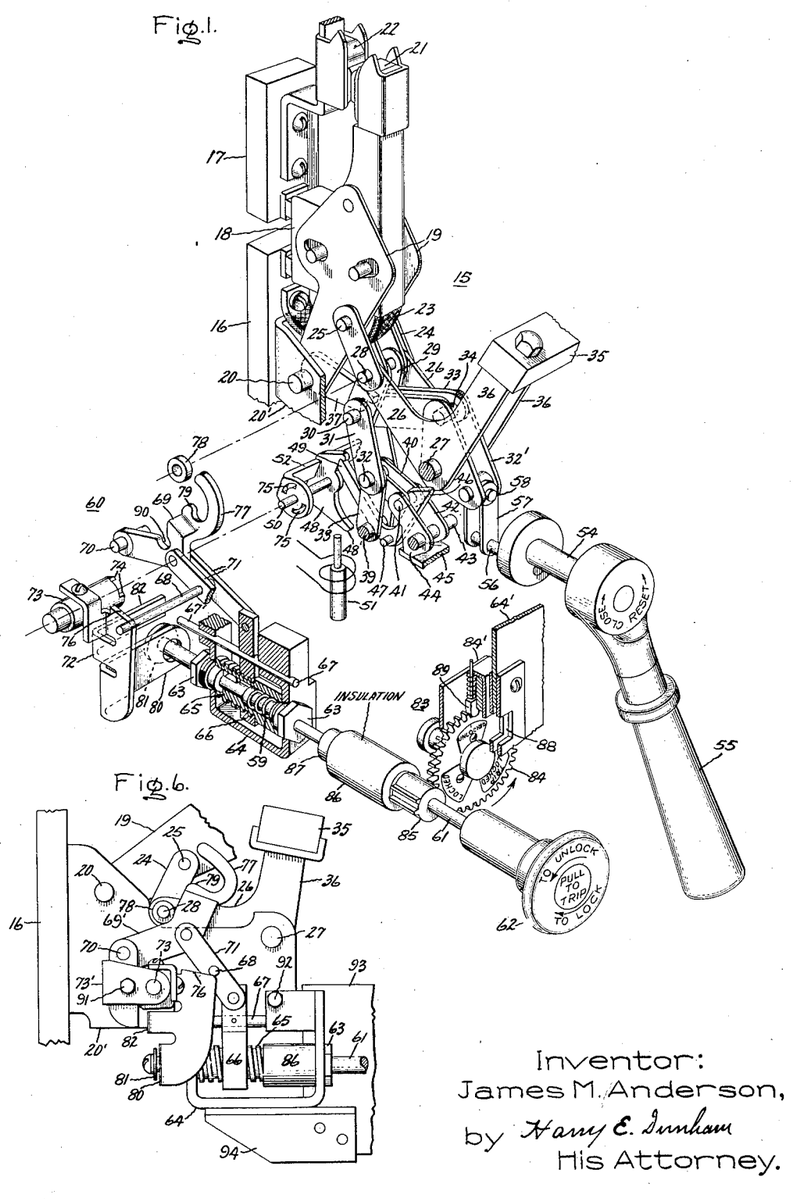
Fig. 1 illustrates in perspective an automatic circuit breaker and locking mechanism embodying my invention, the locking mechanism being spaced from the circuit breaker and partly broken away for clearness of illustration, with the circuit breaker closed and the locking mechanism in the normal or unlocked position.
Fig. 6 is a view similar to Fig. 5 showing a modification of my invention for locking the circuit breaker in the open position.

In Figs. 1 to 5, inclusive, I have illustrated an embodiment of my invention as applied to a latched closed type of automatic circuit breaker 15, shown more completely in Fig. 1. This particular circuit breaker is disclosed in United States Letters Patent 2,227,160 and, as shown herein, comprises two suitably mounted contact blocks 16 and 17, which are arranged to be bridged by a movable contact 18. This contact is suitably mounted on a carrying arm 19, which is pivotally supported on a stationary pin 20 in the circuit breaker frame 20'. The arm 19 also carries an arcing contact 21, which cooperates with a stationary arcing contact 22 on the upper contact block 17. The movable arcing contact 21 is connected to the lower stud 16 by a flexible conductor 23.

For controlling the movement of the contact carrying arm 19 to and from the closed circuit position, the circuit breaker is provided with an operating mechanism of the mechanical advantage type, comprising a main toggle having links 24 pivotally connected to the arm 19 by a pin 25 and links 26 supported on a stationary pivot pin 27 and pivotally joined with the links 24 by a pin 28; a secondary toggle having links 29 supported on the pin 28 and connected by a pin 30 to links 31 which are pivotally supported on a movable abutment pin 32; and an operating toggle comprising links 32' and 33 respectively supported on the pins 27 and 30 and pivotally interconnected at 34. When the circuit breaker has more than one pole, the several poles are interconnected by a crossbar 35 which, as shown, is suitably secured to an angular extension 36 of the links 26. As long as the abutment pin 32 is held in the position shown in Fig. 1, the toggles 24—26, 29—31, and 32'—33 are maintained in the position shown in Fig. 1 by a latch 37 pivotally supported on the pin 20 and suitably biased by force of gravity, a spring or both, for rotation in a direction to engage the pin 30 intermediate the elements of the link 33.

For holding the abutment pin 32 in the position shown in Fig. 1, there is a collapsible mechanism, comprising a link 38 which is pivotally connected to the abutment pin 32 and pivotally supported on a stationary pin 39 and a toggle comprising links 40 supported on the abutment pin 32 and joined by a pin 41 to links 42 which are supported on a stationary pin 43. Counterclockwise rotation of the links 41 about the pin 43 is limited by shoulders 44 on the links 41 which engage a fixed abutment 45. For maintaining the pin 32 stationary, the links 40 and 41 form an underset toggle which is restrained in a thrust transmitting position by a latching member 46 pivotally supported at 47 and biased to latching position by a spring, not shown. In order more firmly to hold this member 46 in the latching position in ordinary use, there is provided a secondary latching member 48 which engages the tail 49 of the latch 46 to prevent rotation thereof in the latch releasing direction. The secondary latch 48 is mounted on a shaft 50 and biased to latching position by a spring, not shown. This latch is caused to rotate in the latch releasing direction, when it is desired to trip the circuit breaker, by suitable electroresponsive means, illustrated as an electromagnetic tripping device 51. This, as is well known to the art, may be connected to be responsive to the current flowing through the particular pole of circuit breaker. In order more positively to effect the release of the main latch 46, the tail 48' of the secondary latch 48 is arranged on movement in the tripping direction, to hit the tail 49 of the main latch. Since, in general, in a multiple-pole breaker, it is desirable to open all poles in the event of an abnormal condition prevailing on one or more, the secondary tripping latch 48 of the mechanism pole is arranged to be actuated in response to the operation of the tripping device 51 associated with the respective poles. For this purpose, there is provided for a pole adjacent the mechanism pole a trip shaft to be rotated by the tripping device 51. This shaft is not shown in the drawings, but as disclosed in United States Letters Patent 2,141,272, it engages slots 75 in a rotatably mounted member 52 which is rigidly associated with the latch 48. The several members are so coupled that the actuation of any tripping device 51 actuates the member 52 and thereby causes the release of the latching members 46 and 48 and the dropping of the abutment pins 32 to effect the collapse of the toggle mechanism of each pole of the circuit breaker.

For resetting the collapsible mechanism which holds the abutment pin 32 and actuating the toggle mechanism to close the circuit breaker when the abutment pin 32 is held stationary, there is mounted on a suitably supported shaft 54 an operating handle 55 for actuating a crank pin 56, the movement of which is imparted to the toggle link 32' and the rest of the mechanism through links 57 which are connected to the links 32' by a universal joint 58. When the circuit breaker is open, the mechanism may be reset for closing by turning the operating handle 55 in one direction and the circuit breaker closed by turning the handle in the opposite direction.

For locking the circuit breaker closed to prevent tripping electrically, heedlessly, or by shock; locking the toggle mechanism to prevent opening heedlessly or by shock; locking the circuit breaker open to prevent closing either heedlessly or by shock; and also for tripping the circuit breaker, I provide a locking and tripping mechanism 60, shown more clearly in Fig. 1 and for the sake of clearness, displaced to the left of the circuit breaker 15. As illustrated, this mechanism 60 comprises a rotatably and reciprocably mounted, manually operable member 61, movable from an initial and normal position shown in Figs. 1 and 2 to another position shown in Fig. 3 to prevent the release of the circuit breaker holding means comprising the trip latch 48; to a third position shown in Fig. 4 to prevent circuit opening movement of the contact 18; and to a position shown in Fig. 5 intermediate said initial and third positions to prevent a circuit closing operation while the contact 18 is in the open circuit position, said member being longitudinally movable in one direction while in the initial position to effect the release of the circuit breaker holding means.

Figure 3:
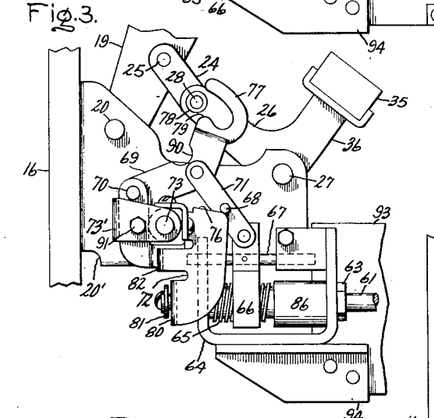
Fig. 3 is a view similar to Fig. 2 showing the circuit breaker closed and the locking mechanism in the trip locked position.
Figure 4:
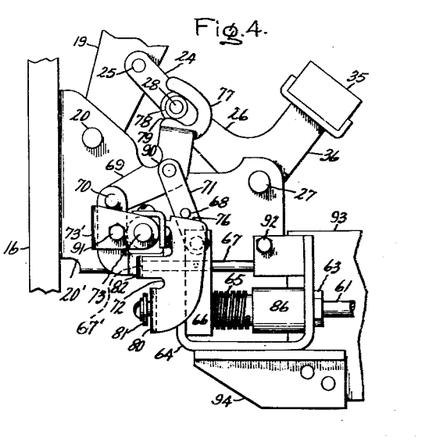
Fig. 4 is a view similar to Fig. 2 showing the circuit breaker closed and locked against opening by both tripping and shock.
Figure 5:
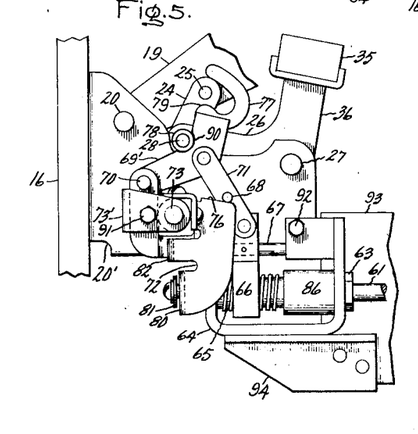
Fig. 5 is a view similar to Fig. 2 showing the circuit breaker locked in the open position.

In order to effect the recited locking operations, the rotatable member or shaft 61, which has an operating handle 62, is journaled at its inner end in two bushings 63 mounted in a generally U-shaped support 64. As shown the outer end of the shaft 61 and also the circuit breaker operating shaft 54 may project through openings in a switchboard 64' of the dead-front metallic type. Bending stresses on the shaft 61 may be relieved to some extent by supporting the handle 62 in a bracket 62' secured to the switchboard 64'. Splined on the shaft 61 within the support 64 so as to rotate with the shaft 61 and yet permit a limited longitudinal movement thereof under the bias of a spring 59 is a threaded cylindrical member 65, cooperating with a traveling nut 66. To guide this nut and prevent it from turning, a guide rod 67 journaled in the support 64 is provided. In order to utilize the movement of the nut 66 for the various locking purposes, it is arranged to actuate an arm 68 for blocking movement of the rotatable trip member 52 and the latch 48 rigidly associated therewith as shown in Figs. 3, 4 and 5 and also to actuate a blocking lever 69 mounted on a stationary pivot 70 for blocking the pin 28 in the circuit closed position shown in Fig. 4 and in the circuit open position shown in Fig. 5. The arm 68 is mounted at an intermediate point on links 71 which connect the nut 66 to the blocking lever 69 so as to impart motion thereto.

Cooperating with the blocking arm 68 for locking the circuit breaker against tripping is a crank 72, which is suitably secured to a shaft 73. This shaft is suitably coupled to or interlocked with the trip member 52 as by the tongue 74 and slot 75 arrangement illustrated in Fig. 1 and is suitably supported at its outer end in a bearing bracket 73' secured to the frame 64. For blocking purposes, the crank 72 is provided with an inclined, shouldered portion 76 over which the blocking arm 68 is moved from the unlocked position shown in Figs. 1 and 2 to the trip locked position shown in Fig. 3 and then to the locked position shown in Fig. 4 when the operating handle 62 is turned clockwise, as viewed in Fig. 1, to effect travel of the nut 66 from right to left. As this nut travels to the locked position, a hook-shaped portion 77 on the blocking lever 69 engages a roller 78 on the toggle joint pin 28 whereby to lock this pin against transitory movement.

For best results, it is not sufficient merely to lock the pin 28 in the position shown in Fig. 1 since under these conditions all the force necessary to maintain the circuit breaker closed is transmitted to the latching mechanism. Consequently, if, while the circuit breaker is closed, there were any tendency for opening, the parts might so settle that the latching mechanism could not hold the circuit breaker closed. Therefore, a subsequent release of the locking mechanism would result in a slow opening of the circuit breaker. This could be most dangerous not only to the operator but also to the apparatus, especially if the circuit breaker opened under heavy load or fault currents. In order to avoid this possibility, I provide the hook 77 of the blocking lever 69 with a shouldered portion 79 such that as the lever 69 is moved to the locking position, the toggle joint pin 28 is raised from the position shown in Figs. 1, 2, and 3 to the position shown in Fig. 4 just enough to take the load off the latching mechanism and thus leave this free to settle to the fully latched position in case it has been deranged by shock or otherwise while the circuit breaker was locked. Incidentally, this raising of the toggle joint pin 28 materially straightens the toggle comprising the links 24 and 26 so that this toggle is in a better thrust transmitting position when the circuit breaker is locked than otherwise.

In order to trip the circuit breaker by pulling outwardly on the handle 62 when the locking mechanism is in the normal or unlocked position, the tripping crank 72 is provided with a wing portion 80 through a hole in which the inner end of the shaft 61 projects. On this inner end of the shaft, there is suitably secured a projection 81, engageable with the wing 80 of the tripping crank 72 to turn this crank in the tripping direction when the handle 62 is pulled outwardly. In order more rigidly to hold the tripping crank 72 against possible tripping when the locking mechanism is in the locked position shown in Fig. 4, the inner end 67' of the nut guide rod 67 may be arranged to abut a wing 82 on the tripping crank 72, as shown more clearly in Fig. 4.

Figure 2:
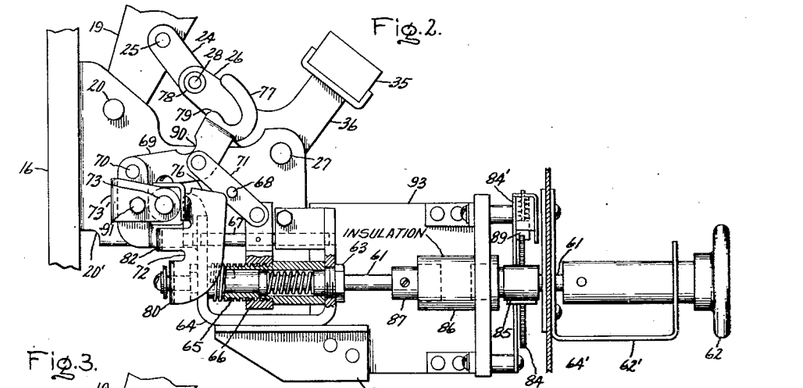
Fig. 2 is a side elevation of the embodiment of my invention illustrated in Fig. 1.

In order to know the position of the locking mechanism when the circuit breaker is closed without the necessity of examination of the parts, I provide a visual indicating mechanism 83, shown in Figs. 1 and 2. As illustrated, this mechanism comprises a gear member 84 which is rotatably mounted in a supporting plate 84' and which is adapted to be turned upon rotation of the shaft 61 by a fractional gear 85 mounted on the shaft 61. I use the fractional gear 85 since the number of turns of the shaft 61 to effect movement of the nut 66 from one locking position to the other would impart too much movement to the gear 84 for the purpose I have in mind. In one embodiment of my invention, I mold the fractional gear 85 into an insulation coupling 86 having a molded-in metallic bushing 87 whereby it is joined to an extension of the shaft 61 so as to provide insulation and safety for the operator. On the gear 84, I mount a plurality of indicating vanes respectively marked "unlocked," "trip locked," and "locked." These are visible when turned into the upper vertical position through a window 88 in the switchboard 64', the switchboard leg of the bracket 62' on dead-front switchboards, and a backing plate. For definitely setting or clocking the gear 84 as it is moved tooth by tooth, I provide a spring pressed pawl 89.

Inasmuch as it is sometimes just as important to prevent an open circuit breaker from being closed by shock as it is to prevent a closed circuit breaker from being opened by shock, I provide in conjunction with the locking means described for maintaining the circuit breaker closed, an arrangement for also holding it open, as shown in Figs. 1 to 5, inclusive. This is accomplished by providing the blocking lever 69 with a notch 90, which in the open position of the circuit breaker is adapted to be operated by movement of the lock operating handle 62 to a position to embrace the roller 78 on the toggle joint pin 28 whereby to prevent the straightening of the toggle comprising the links 25 and 26, as shown in Fig. 5. I have found out that if the blocking lever 69 does not have this full semicircular opening 90, but is shaped as shown in Fig. 6, the breaker can also be effectively prevented from closing by turning on the operating handle 62 in the locking direction until the locking lever 69' of Fig. 6 engages the roller 78. This latter arrangement apparently is effective in consequence of the cramping of the parts due to the fact that there is more or less lost motion in consequence of the necessary clearances and manufacturing tolerances. However, I prefer the arrangement shown in Figs. 1 to 5 since this insures a more efficient and positive way of locking the toggle pin 28 in the open circuit position.

In order that the locking mechanism 60 may be quickly and easily attached to and detached from the circuit breaker, the U-shaped frame 64 is arranged to be bolted directly to the circuit breaker frame 20' at 91 and 92, as shown more clearly in Figs. 2 to 6, inclusive. Also, as shown in Fig. 2, the indicating mechanism 83 and its mounting plate 84' may be supported integrally with the locking mechanism 60, by a bracket 93 of insulating material suitably secured to the U-shaped frame 64 as, for example by an angle support 94.

Assuming the parts positioned as shown in Figs. 1 and 2, then the circuit breaker is unlocked and can function normally as an automatic trip-free circuit breaker since neither the trip latch 48 nor the toggle 24, 26 is restrained against movement. If it is desired to lock the circuit breaker against being tripped automatically, heedlessly or by shock, then the operating handle 62 is turned clockwise, as viewed in Fig. 1, until the "trip locked" vane appears in the window 88. The nut 66 is then in the position shown in Fig. 3 with the arm 68 bearing on the shoulder 76 of the crank 72 whereby to lock this crank against movement and thus to prevent any tripping action of the trip latch 48. If, while the circuit breaker is closed and the locking mechanism is unlocked, as shown in Figs. 1 and 2, the circuit breaker is automatically opened in response to the actuation of the electroresponsive device 51 and it is desired to reclose the breaker even though the circuit controlled by the breaker may be faulty or heavily overloaded, then the operator after resetting the circuit breaker mechanism turns the handle 62 clockwise from the "unlocked" position to the "trip locked" position. The trip latch 48 is then locked against movement and the circuit breaker can be closed on overload or fault currents. In other words, whenever the circuit breaker opens, it is possible to reclose it and be sure that it will remain closed by first resetting the circuit breaker mechanism, then moving the locking mechanism to the "trip locked" position, and finally closing the circuit breaker.

In the event that it is desired to prevent the opening of the circuit breaker by shock which might release the circuit breaker mechanism holding latch 37, then the operating handle is turned clockwise until the "locked" indicator vane appears in the window 88 and the parts assume the position shown in Fig. 4 with the hook-shaped portion of the operating lever 69 engaging the roller 78 on the toggle joint pin 28. During this movement of the operating handle 62 to the "locked" position, the shoulder 79 on the hook-shaped portion of the operating lever 69 raises the toggle joint pin 28 sufficiently to take the load of the circuit breaker toggle mechanism off the abutment 32 and the collapsible latching mechanism associated therewith, as previously described, so that this mechanism can settle into normal position in the event that the latches are jarred loose while the circuit breaker is closed and locked against shock. Then, when the locking mechanism is released, the breaker mechanism is correctly latched so as to prevent a slow opening of the circuit breaker and the dangers consequent upon drawing arcs. If the circuit breaker is open and it is desired to lock it from closing against shock or heedless action, then the locking handle 62 is turned clockwise until the arc-shaped portion 90 engages the roller 78 on the toggle joint pin 28, as shown in Fig. 5. It is then impossible to reclose the circuit breaker.

In Figs. 7, 8, 9, and 10, I have illustrated an embodiment of my invention as applied to an automatic trip-free circuit breaker mechanism such as disclosed in United States Letters Patent 2,152,453, issued March 28, 1939. As shown, this mechanism comprises a main operating toggle consisting of links 100 and 101 pivotally joined at 102. This toggle is arranged to be actuated by a rotatably mounted handle 103, the rotation of which turns a crank 104 to move a reciprocally guided crosshead 105. This is connected to the crank pin of the crank 104 by a link 106 and to the toggle joint pin 102 by a link 107. The toggle link 100 is pivotally connected by a pin 108 to a link 109 mounted on a stationary pivot 110. The toggle link 101 is pivotally connected by a pin 111 to a crank 112, which is rotatable on a fixed shaft 113.

The crank 112 has two rigidly interconnected, parallel wings 114 and 115 through which the shaft 113 extends. The wing 114 is connected to the toggle link 101, while the wing 115 is provided with a cam surface 116. This cam surface is arranged to coact with a contact operating crank 117, which is rigidly connected through a rotatable suitably insulated countershaft 118 to the movable contact carrying arm 119 of the circuit breaker. When the crank 112 is rotated clockwise by straightening the operating toggle 100—101 in response to elevation of the crosshead 105, the cam face 116 bearing on a roller 120 on the crank 117 rotates the countershaft 118 counterclockwise to bring the movable contact structure 121 of the circuit breaker into engagement with the stationary contact structure 122, 123.

In order to hold the toggle 100—101 at the pivot 108 in thrust transmitting position relatively to the crank 112, there is associated with the toggle guide link 109 a latching and tripping means comprising a link 124, which is connected to the pin 108 and to a latch 125 mounted on a fixed pivot 126. The link 124 and the latch 125 are suitably interconnected, as at 127, to insure a force reducing connection. Coacting with the latch 125 is a rotatable tripping shaft 128 to which is secured a detent member 129 adapted to engage the tail of the latch 130.

In the position shown, collapse of the toggle 100—101, that is, counterclockwise rotation of the pivot pin 108 and tripping of the toggle joint 102, is restrained by the latch 125 and the detent 129. Tripping movement, that is, counterclockwise rotation of the tripping shaft 128, effects release of the latch 125 so that it is free to rotate counterclockwise to release the pin 108 and thereby permit collapse of the toggle. In the circuit closed position, the toggle 100—101 is held in an underset position by a prop 131 which is arranged to support the toggle joint 102. This prop is secured to a rotatable shaft 132 and is resiliently connected by a spring 133 to an arm on the tripping shaft 128 so as to facilitate resetting of both the prop and the latching means after a circuit opening operation of the mechanism. The prop 131 is also biased for counterclockwise rotation by suitable means, such as a torsion spring 134.

The tripping shaft 128 is provided with an arm 135 whereby it can be rotated counterclockwise to the releasing position by suitable electroresponsive means, indicated simply as the end of the tripping plunger 136 of an electromagnet which may be energized, for example, in response to the current flowing through the circuit breaker, as is well known to the art. Clockwise rotation of the tripping shaft is limited by a stop 135'.

The contact operating crank 117 is connected to the crank 112 by means of a compression spring 137, which is guided on a member 138 engaging one end of the crank 112 and having a guided sliding connection at 139 with the downwardly extending arm of the crank 117. In the closed circuit position shown, the spring 137 is under compression so that immediately upon release of the tripping latch, the collapse of the toggle 100—101 is accelerated by the energy stored in the spring whereby to effect rapid movement of the cam surface 116 away from the roller 120. The contact operating crank 117 is also acted upon throughout the opening movement by the spring 137, tending to accelerate separation of the contacts 121, 122, and 123. During the closing operation when the crank 112 is rotated clockwise, the spring 137 is placed under compression by reason of the comparatively long lever arm of the crank 117 acting in opposition to the spring.

When the toggle 100—101 is released in response to a tripping operation, the pivot pin 108 is free to rotate counterclockwise about pivot 110. This causes a shift of the toggle joint 102 from the end of the prop 131 and permits a free collapse of the toggle. When this occurs, the pivot 108 reverses its movement and drops so that the latch 125 can return to its initial position. During this return movement, the nose 130 of the latch rides over the latch detent 129 and resets in the position illustrated in Fig. 1. The prop 131 is suitably shaped, as illustrated, for permitting free movement of the toggle joint 102 alongside the prop.

The resilient connection 133 between the trip shaft 128 and the prop 131 biasing the tripping detent into latching engagement after the latch 125, in dropping, pushes down on and passes by the latch detent 129, the latter snapping into reset position due to the bias of the spring 133. At the same time, the spring 133 and the spring 134 exert a counterclockwise bias on the prop 131 urging it against the side of link 107 so that when the links 100 and 101 are raised to the position, shown in Fig. 7, in a subsequent closing operation, the prop 131 is snapped beneath the toggle joint 102 to hold the mechanism in the closed position independently of the actuating handle 103. A stop member 140 is provided for preventing movement of the prop beyond the toggle joint 102.

As in the embodiment of my invention shown in Fig. 1, I have provided means for locking the circuit breaker against opening in case of a shock which would release the latching mechanism or the prop 131 and also in case of automatic tripping and heedless tripping. The locking mechanism comprises a rotatable shaft 61' which is journaled at its inner end in two bushings 63' mounted in a generally U-shaped support 64'. The shaft 61' will, of course, be provided with a suitable operating handle and indicating mechanism, which may be like that shown in Fig. 1. Splined on the inner end of the shaft 61' within the support 64' so as to rotate with the shaft and yet permit a limited longitudinal movement thereof, is a threaded cylindrical member 65' cooperating with a traveling nut 66'. In this case, the nut 66' is guided and prevented from turning by one side of the U-shaped member 64' and a supporting plate 64", which is suitably secured to a portion 20" of the circuit breaker frame. In order to utilize the movement of the nut 66' for the various locking purposes, it is provided with a projection 71', which extends inwardly toward the circuit breaker mechanism and also carries a stiffly spring-biased plunger 68'.

Figure 7:
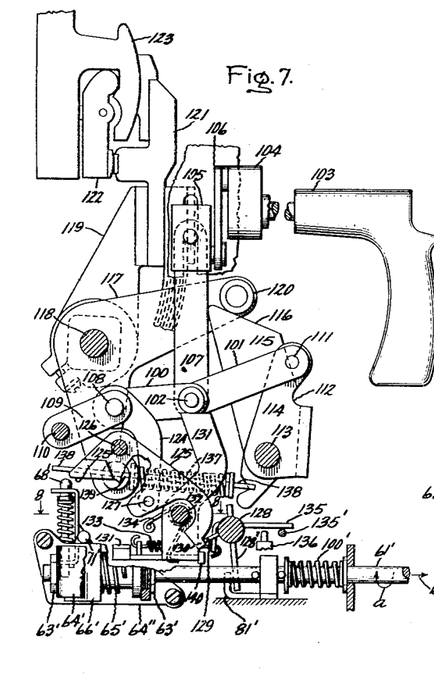
Fig. 7 is a side elevation partly in section of another circuit breaker mechanism and a modification of the embodiment of my invention shown in Fig. 1 with the circuit breaker closed and the locking mechanism in the normal or unlocked position.
Figures 8, 9:
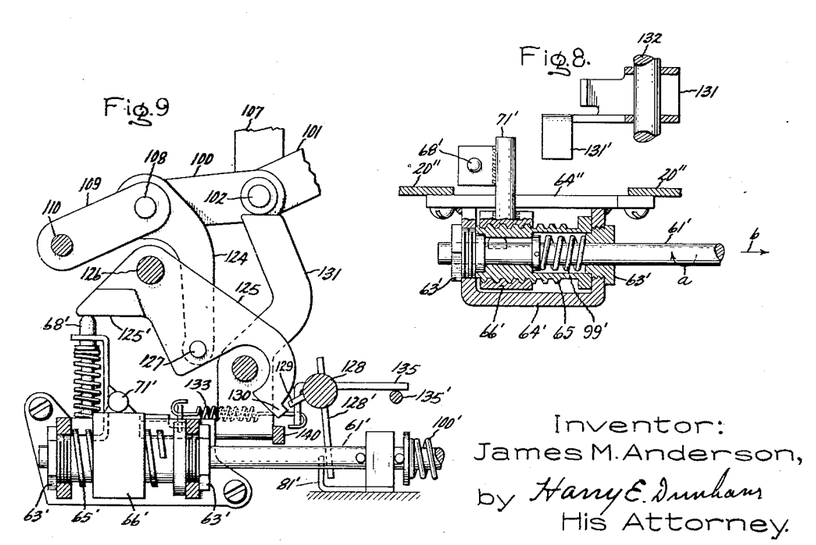
Fig. 8 is a part sectional view on the line 8—8 of Fig. 7.
Fig. 9 is a view similar to Fig. 7 showing the circuit breaker closed and the locking mechanism in the trip locked position.

When the parts are positioned, as in Fig. 7, for the normal intended operation of the circuit breaker, the nut 66' is substantially against the side of the inner leg of the U-shaped member 64' with the plunger 68' clear of the shoulder 125' of the latch 125 so that this latch is free to be released whenever the tripping shaft 128 is actuated. If it is desired to prevent any release of the circuit breaker mechanism by actuation of the latch 125, the shaft 61' is turned in the direction indicated by the arrow a in Fig. 7 until the plunger 68' rides under the end of the shoulder 125' on the latch 125 into the position shown in Fig. 9. The circuit breaker latching mechanism cannot then be tripped by shock or otherwise since the latch 125 is prevented from rotating counterclockwise, that is in the tripping direction. Preferably, I so arrange the plunger 68' that it actually rotates the latch 125 clockwise enough to clear the detent 129 on the tripping shaft 128 in order that this shaft may be free to return to the normal non-trip position in which the detent 129 would engage the nose 130 of the latch. If this is not done, there is a likelihood that, because of lost motion due to manufacturing tolerances, the latch 125 might move clockwise enough to prevent the restoration of the detent 129 to hold the latch when the plunger stop 68' is backed off to the position shown in Fig. 1. This could result in an undesired and dangerous opening of the circuit breaker.

Figure 10:
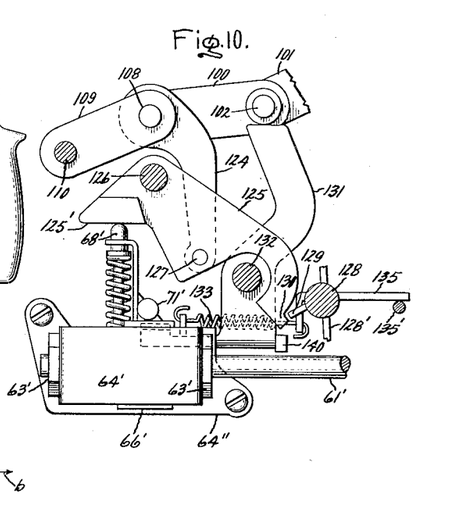
Fig. 10 is a view similar to Fig. 7 showing the circuit breaker closed and locked against opening by both tripping and by shock.

If it is desired to prevent release of the prop 131 by shock, then the shaft 61' is turned further in the direction indicated by the arrow a to the position shown in Fig. 10 with the nut 66' at the outer end of its travel. In this case, the projection 71', carried by the nut 66', moves over a projection or shelf 131' on the inner end of the prop 131 to prevent any possibility of clockwise rotation of the prop and release of the operating toggle 100—101 by reason of the removal of the support of the toggle joint pin 102. Thus, with the parts positioned, as shown in Fig. 2, the circuit breaker operating toggle is locked against release by shock and the latching mechanism is also locked against release by shock, automatic tripping, and heedless operation.

For tripping the circuit breaker manually, the tripping shaft 128 is lengthwise movably mounted and is provided with a projection 128', which extends in the path of movement of a projection 81' mounted on the shaft 61' so as to partake only of the lengthwise movement thereof. Thus, if it is desired to trip the circuit breaker manually, the shaft 61' is pulled outwardly in the direction indicated by the arrow b against the bias of a return spring 99' and a return spring 100' until the projection 81' on the shaft 61' engages the projection 128' on the tripping shaft 128 and moves this shaft sufficiently to release the detent 129' from the latch 125. If the locking mechanism is in the trip locked or shock locked position and the operating shaft 61' is pulled outwardly, the tripping shaft will be actuated to the releasing position, but the circuit breaker will not open. Moreover, if the handle is subsequently released, the tripping shaft can return to the latching position because of the overset condition of the latch 125 when the plunger 68' lies under the shoulder 125' of the latch.

Figure 11:
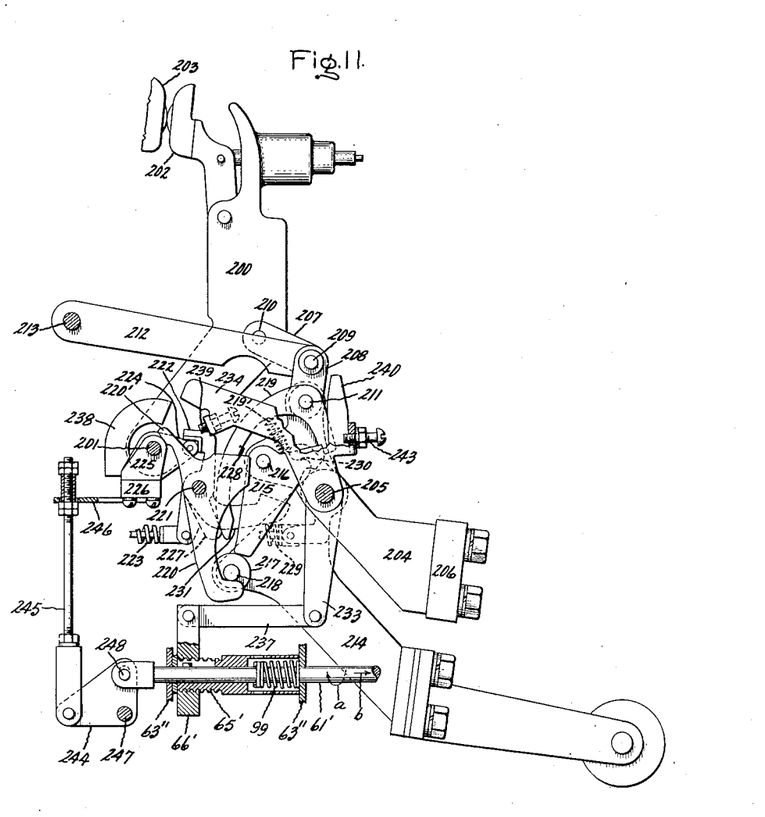
Fig. 11 is a side elevation partly in section of still another circuit breaker mechanism and a modification of the embodiment of my invention shown in Fig. 1 with the circuit breaker closed and the locking mechanism in the normal or unlocked position.
Figure 12:
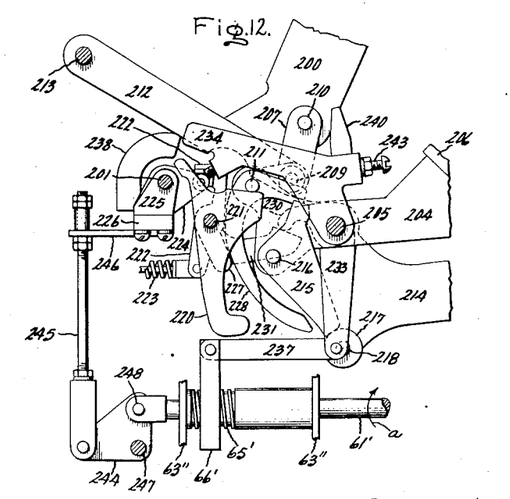
Fig. 12 is a view similar to Fig. 11 showing the circuit breaker open and trip locked for closing.
Figure 13:
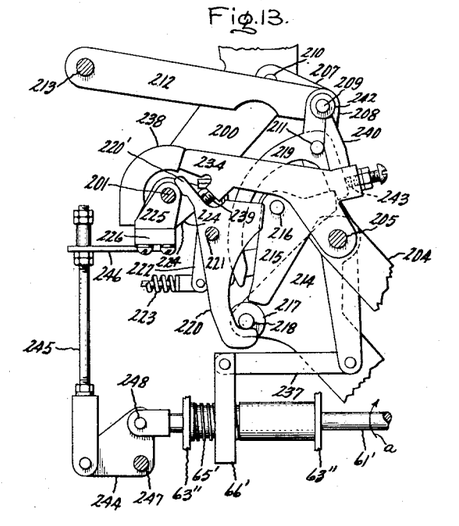
Fig. 13 is a view similar to Fig. 11 showing the circuit breaker closed and locked against opening by both tripping and shock.

In Figs. 11, 12, and 13, I have illustrated an embodiment of my invention as applied to another form of automatic trip-free circuit breaker mechanism known to the art. This mechanism is for controlling the opening and closing movements of a contact carrying arm 200, which is mounted on a stationary pivot 201. This arm carries an arcing contact 202 and also a suitable main contact of the bridging type, which is not illustrated, since its specific structure constitutes no part of my present invention. The movable arcing contact 202 cooperates with a stationary arcing contact 203. The operating mechanism comprises a toggle lever 204, which is mounted on a stationary pivot 205 and provided on one side of this pivot with a crossbar 206 for connecting the mechanisms of the several poles of a multi-pole circuit breaker. On the other side of the pivot 205, an arm of the toggle lever 204 is connected to the contact carrying arm 200 through a toggle comprising links 207 and 208, pivotally connected at 209, and respectively pivoted to the contact carrying arm 200 at 210 and the toggle lever 204 at 211. The toggle joint pin 209 is constrained to move in a circular arc by a link 212 mounted on a stationary pivot 213. The links 207 and 212 joined at 209 constitute a toggle for controlling the movement of the contact arm 200.

For trip-free operation of the circuit breaker, there is provided an operating lever 214, which is mounted on the stationary pivot 205, and readily releasable means for rigidly connecting the operating lever to the toggle lever 204. This means comprises a prop latch 215, which is pivotally supported on the toggle lever at 216. This prop latch is arranged to engage a roller 217, which is mounted on a pin 218 carried by the operating lever 214. The prop latch 215 is maintained in the latching position by a secondary latch 219, which is mounted on the pivot 211 in the toggle lever 204. The prop and secondary latches are biased for clockwise movement into latching engagement with each other and the prop latch into engagement with the roller 217 by a compression spring 219', shown in Fig. 11, but omitted in the other figures for the sake of clearness. This spring is interposed between the long tail 228 of the secondary latch and a shoulder on the prop latch. When the circuit breaker is open and the parts positioned as shown in Fig. 12 with the latches 215 and 219 correctly engaged with each other and the latch 215 in engagement with the roller 217, clockwise movement of the operating lever 214 moves the contact carrying arm 200 into the circuit closing position where it is held by a hook latch 220, which is mounted on a stationary pivot 221 and which is engaged by the pin 218 on the operating lever to maintain the circuit breaker closed. The latch 220 is biased for counterclockwise movement by a torsion spring, not shown. This movement is limited by a projection 220' on the latch which engages a member 225 mounted on the pivot 201. During the opening of the circuit breaker, a small clockwise movement of the latch 220 is effected when the pin 211 engages the upper edge of the latch, as shown in Fig. 12.

The latching mechanism is released for opening the circuit breaker by an impulse tripping device, which comprises a tripping lever 222 mounted on the stationary pivot 221 and biased for counterclockwise rotation by a compression spring 223, the left-hand abutment of which is omitted. As shown more clearly in Fig. 11, the tripping latch 222 is maintained in the biased position by a tripping catch 224 mounted on the pivot 201 and restrained against clockwise rotation by suitable bias, including the weight of a tripping armature, not shown. Rigidly associated with the tripping catch 224 is an arm 225 to which is secured a tripping crossbar 226. This interconnects with similar arms associated with the other poles of a multi-pole circuit breaker so that the actuation of the arm 225 in any pole by the associated tripping magnet of that pole or otherwise will effect releasing or clockwise rotation of the catch 224. When this occurs and the spring 223 causes clockwise rotation of the tripping lever 222, an arm 227 thereof is pushed against the long arm 228 of the secondary latch 219 to rotate it counterclockwise and free its short arm from the prop latch 215 and to cause the long arm of the secondary latch to hit the prop latch and free it from the roller 217. The weight of the circuit breaker parts and contacts, strongly biased by compression springs, not illustrated, and the bias of a compression spring 229, which is energized during the closing of the circuit breaker, effects a quick circuit opening movement of the contact arm 200. During the opening movement, the counterclockwsie rotation of the toggle lever 204 is utilized to release the hook latch 220 from the pin 218. This is accomplished by having a projection on the toggle lever 204 such as the pin 211, for example, engage the upper edge of the hook latch and rotate the same clockwise out of engagement with the pin 218.

To reset the circuit breaker mechanism for closing, the closing lever 214 is turned counterclockwise about its pivot 205 from the lower position shown in Fig. 11 to the upper position shown in Fig. 12. During this movement, a projection 230 on the closing lever 214 engages a tail 231 on the latch 222 and rotates this latch counterclockwise about its pivot 221 until the roller on the tripping arm 224 drops into latching position with the latch 222. At the same time, the impulse tripping spring 223 is reenergized. As soon as the projection 227 of the latch 222 is moved clear of the tail 228 of the secondary latch 219, this latch and the prop latch are free to reset under the bias of spring 219' into latching engagement with each other and the prop latch into engagement with the roller 217. The toggle lever 204 and the closing lever 214 are then again rigidly interlatched, as shown in Fig. 12. Downward clockwise movement of the operating lever 214 closes the circuit breaker and brings the pin 218 into engagement with the hook latch 220.

As in the other illustrated embodiments of my invention, I have provided means for locking the circuit breaker against opening in case of a shock, which would release the latches that hold the contact arm 200 in the circuit closing position and, also, in case of automatic tripping and heedless tripping. The locking mechanism comprises a rotatable shaft 61', which is journaled at its inner end in two bearings 63" arranged to be suitably secured to the circuit breaker frame. The shaft 61' will, of course, be provided with a suitable operating handle and indicating mechanism, which may be like that shown in Fig. 1. Splined on the inner end of the shaft 61' between the support 63" so as to rotate with the shaft and yet permit a limited longitudinal movement thereof is a threaded cylindrical member 65' cooperating with a traveling nut 66', which is suitably guided and prevented from turning when the cylindrical member 65' is actuated by turning the shaft 61'. When the parts are positioned as shown in Fig. 11 for the normal, intended operation of the circuit breaker, the nut 66' is substantially against the inner bearing member 63".

Figure 14:
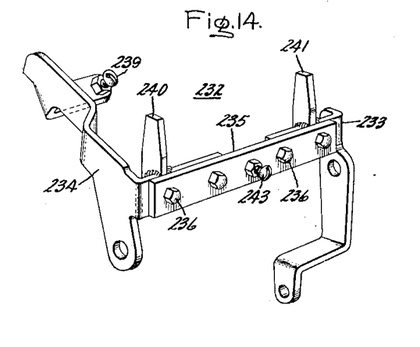
Fig. 14 illustrates in perspective one element of the locking mechanism shown in Figs. 11, 12 and 13.

For utilizing the travel of the nut 66' to perform the desired locking operations, I provide, as shown more clearly in Fig. 14, a blocking member 232 which, particularly for circuit breakers already installed, may consist of two separate elements 233 and 234 respectively, suitably joined as by a crossbar 235 and cap screws 236. For assembly on an installed circuit breaker, the elements 233 and 234 of this blocking member are separately mounted on opposite ends of the pivot 205 and then joined by the crossbar 235. The element 233 is connected by a link 237 to the nut 66' to partake of movement thereof.

For the normal, intended operation of the circuit breaker, the blocking member 232 is in the position shown in Fig. 11, and in this position, it is ineffective to prevent opening of the circuit breaker from any cause. If it is desired to lock the circuit breaker closed against shock and tripping, then the shaft 61' is turned in the direction indicated by the arrow $a$ to advance the nut 66' to the position shown in Fig. 13. In so doing, the blocking member is rotated counterclockwise about its axis 205 to the full blocking position. In this position, the inner end of the left-hand prop 234 abuts squarely against an arm 238, which is rigidly associated with the tripping arm 224 whereby to prevent any clockwise rotation of this arm to the tripping position. At the same time, an adjustable abutment, such as a screw 239 mounted on the left-hand blocking member 234, engages the hook latch 220 to lock the same against release by shock from the pin 218. The circuit breaker mechanism is further blocked against movement by projections 240 and 241 respectively mounted on the left- and right-hand prop members and so positioned that, as shown in Fig. 13, the members 240 and 241 respectively come under rollers 242 mounted on the left- and right-hand ends of the toggle joint pin 209.

The members 240 and 241 thus hold the toggle joint pin 209 to prevent an opening movement of the contact arm 200. Further to insure that the prop latch 215 and secondary latch 219 are maintained in the correct latching position so that the circuit breaker will not open when the blocking member 232 is released, I provide on this member an adjustable abutment 243, which engages the short tail of the secondary latch 219 to prevent counterclockwise rotation and release of this latch from the prop latch 215. In other words, all of the latches and toggle features are so blocked that regardless of shock and attempts at tripping, either automatic or otherwise, the circuit breaker cannot be opened.

Referring now to Fig. 12 in which the circuit breaker mechanism is shown in the open position and reset ready to close, the blocking member 232 has been partially rotated around its axis 205 so that the prop member 234 is down in front of the trip arm extension 238 to effectively block any clockwise movement of the trip arm 224 to the tripping position. Consequently, the circuit breaker can now be closed on an overload and will remain closed. Then, when closed, the shaft 61' can be rotated to turn the blocking member 232 to the full locked position shown in Fig. 13 so as completely to lock the circuit breaker against automatic tripping, heedless tripping, and shock.

As in the other modifications of my locking mechanism, the shaft 61' is reciprocably mounted so that it can be moved in the direction of the arrow $b$ to trip the circuit breaker. The shaft 61' is biased for movement in the direction opposite to the arrow $b$ by a spring 99. For tripping the circuit breaker upon movement of the shaft 61' in the direction of the arrow $b$, this movement is arranged to be imparted to the tripping bar 226 through a motion transmitting mechanism comprising a crank 244, a connecting rod 245, and a crank arm 246 on the tripping bar. The crank 244 is pivoted on a stationary pivot 247 and loosely pivoted to the shaft 61' at 248. The connecting rod 245 is preferably adjustable, as shown. With this arrangement, it will be obvious that when the shaft 61' is moved in the direction of the arrow $b$, the connecting rod 245 is moved upwardly to turn the tripping arm 224 to the circuit breaker releasing position whereby to effect the opening of the circuit breaker. If the blocking mechanism is in either the fully locked position shown in Fig. 13 or the intermediate trip locked position shown in Fig. 12, then the circuit breaker cannot be heedlessly tripped by pulling outwardly on the shaft 61'. Hence, the tripping arm 224 is then blocked against clockwise rotation.

While I have shown and described my invention in considerable detail, I do not desire to be limited to the exact arrangements shown, but seek to cover in the appended claims all those modifications that fall within the true spirit and scope of my invention.

What I claim as new and desire to secure by Letter Patent of the United States is:

1. In a locking mechanism for an electric switch having relatively movable cooperating contacts provided with actuating means for effecting a circuit closing movement thereof together with means for holding the contacts in the circuit closing position and means for releasing the holding means; locking means movable from an initial position to another position to prevent the release of the holding means and to a third position to prevent relative movement of the contacts, and a rotatable member for effecting the movement of said locking means longitudinally movable in one direction while the locking means is in the initial position to effect the release of the holding means.

2. In a locking mechanism for an electric switch having relatively movable cooperating contacts provided with actuating means for effecting a circuit closing movement thereof together with means for holding the contacts in the circuit closing position, and means for releasing the holding means; locking means movable from an initial position to another position to prevent the release of the holding means and to a third position to prevent relative movement of the contacts while in the circuit closing position and to a position intermediate said initial and third positions to prevent a circuit closing operation of the contacts while in the circuit open position.

3. In a locking mechanism for an electric switch having relatively movable cooperating contacts provided with actuating means for effecting a circuit closing movement thereof together with means for holding the contacts in the circuit closing position, and means for releasing the holding means; locking means movable from an initial position to another position to prevent the release of the holding means and to a third position to prevent relative movement of the contacts while in the circuit closing position and to a position intermediate said initial and third positions to prevent a circuit closing operaton of the contacts while in the circuit open position, and a rotatable member for effecting the movement of said locking means longitudinally movable in one direction while the locking means is in the initial position to effect the release of the holding means.

4. In a locking mechanism for an automatic electric circuit breaker having a relatively stationary contact, a cooperating pivotally supported contact, a toggle mechanism for moving the cooperating contact into current-conducting engagement with the stationary contact, a latching member for holding the toggle mechanism in a thrust transmitting position to maintain the contacts in circuit closing position, and electroresponsive means for releasing the latching member; locking means movable from an initial position to another position to prevent movement of the latching member from the toggle holding position and to a third position to hold the toggle mechanism in a thrust transmitting position independently of the holding means whereby to maintain the contacts in the circuit closing position and to a position intermediate said initial and third positions to prevent a circuit closing operation of the contacts while in the circuit open position.

5. In a locking device for an automatic electric circuit breaker having a relatively stationary contact, a cooperating pivotally supported contact, a toggle mechanism for moving the cooperating contact into current-conducting engagement with the stationary contact, a latching member for holding the toggle mechanism in a thrust transmitting position to maintain the contacts in circuit closing position, and electroresponsive means for releasing the latching member; locking means movable from an initial position to another position to prevent movement of the latching member from the toggle holding position and to a third position to hold the toggle mechanism in a thrust transmitting position independently of the holding means whereby to maintain the contacts in the circuit closing position, said locking means comprising a reciprocably mounted member biased for movement in one direction and adapted to be moved in the opposite direction while the locking means is in the initial position to effect the release of said latching member.

6. In a locking mechanism for an automatic electric circuit breaker having a relatively stationary contact, a cooperating pivotally supported contact, a toggle mechanism for moving the cooperating contact into current-conducting engagement with the stationary contact, a pivoted latching member for holding the toggle mechanism in a predetermined thrust transmitting position to maintain the contacts in circuit closing position, and electroresponsive means for releasing the latching member; locking means movable from an initial position to another position to prevent turning of the latching member from the toggle holding position and to a third position to hold the toggle mechanism in a different predetermined thrust transmitting position independently of the holding means whereby to maintain the contacts in the circuit closing position, said locking means comprising a reciprocably mounted member biased for movement in one direction and adapted to be moved in the opposite direction while the locking means is in the initial position to effect the release of said latching member.

7. In a locking mechanism for an automatic electric circuit breaker having relatively fixed and movable cooperating contacts, a toggle mechanism for moving the movable contact into current-conducting engagement with the stationary contact, means for holding the toggle mechanism in a predetermined thrust transmitting position to maintain the contacts in circuit closing position, and means for releasing the holding means; locking means movable from an initial position to another position to prevent the release of the holding means from the toggle holding position and to a third position to hold the toggle mechanism in a different predetermined thrust transmitting position independently of said holding means whereby to maintain the contacts in the circuit closing position, said locking means comprising a reciprocably mounted member biased for movement in one direction and adapted to be moved in the opposite direction while the locking means is in the initial position to effect the release of the holding means.

8. In a locking mechanism for an automatic electric circuit breaker having relatively fixed and movable cooperating contacts, a toggle mechanism for moving the movable contact into current-conducting engagement with the fixed contact, means for holding the toggle mechanism in a predetermined thrust transmitting position to maintain the contacts in circuit closing position, and means for releasing the holding means; locking means movable from an initial position to another position to prevent the release of the holding means from the toggle holding position and to a third position to hold the toggle mechanism in a different predetermined thrust transmitting position independently of the holding means whereby to maintain the contacts in the circuit closing position.

9. In a locking mechanism for an automatic electric circuit breaker having a relatively stationary contact, a cooperating pivotally supported contact, a toggle mechanism for moving the cooperating contact into current-conducting engagement with the stationary contact, a pivoted latching member for holding the toggle mechanism in a thrust transmitting position to maintain the contacts in circuit closing position, and electroresponsive means for releasing the latching member; locking means movable from an initial position to another position to prevent turning of the latching member from the toggle holding position and to a third position to hold the toggle mechanism in a straighter thrust transmitting position independently of the holding means whereby to maintain the contacts in the circuit closing position, said locking means comprising a reciprocably mounted member biased for movement in one direction and adapted to be moved in the opposite direction while the locking means is in the initial position to effect the release of the latching member.

10. In a locking mechanism for an automatic electric circuit breaker having a relatively stationary contact, a cooperating pivotally supported contact, a toggle mechanism for moving the cooperating contact into current-conducting engagement with the stationary contact, a pivoted latching member for holding the toggle mechanism in a thrust transmitting position to maintain the contacts in circuit closing position, and electroresponsive means for releasing the latching member; locking means movable from an initial position to another position to prevent turning of the latching member from the toggle holding position and to a third position to hold the toggle mechanism in a straighter thrust transmitting position independently of the holding means whereby to maintain the contacts in the circuit closing position and to a position intermediate said initial and third positions to prevent a circuit closing operation of the contacts while in the circuit open position.

11. In a locking mechanism for an automatic electric circuit breaker having a relatively stationary contact, a cooperating pivotally supported contact, a toggle mechanism for moving the cooperating contact into current-conducting engagement with the stationary contact, a pivoted latching member for holding the toggle mechanism in a predetermined thrust transmitting position to maintain the contacts in circuit closing position, and electroresponsive means for releasing the latching member; locking means movable from an initial position to another position to prevent turning of the latching member from the toggle holding position and to a third position to hold the toggle mechanism in a different predetermined thrust transmitting position independently of the holding means whereby to maintain the contacts in the circuit closing position and to a position intermediate said initial and third positions to prevent a circuit closing operation of the contacts while in the circuit open position.

12. In a locking mechanism for an electric switch having relatively movable cooperating contacts provided with actuating means for effecting a circuit closing movement of the contacts, together with means for holding the contacts in the circuit closing position, and means responsive to the condition of the circuit through the contacts for releasing the holding means; means for preventing a circuit opening movement of the contacts by the releasing means and in consequence of shocks comprising a member rotatable a predetermined amount in one direction from an initial position to prevent the release of the holding means and a further predetermined amount in the same direction to prevent relative movement of the contacts, said member being longitudinally movable in one direction while in said initial position to effect the release of the holding means.

13. An electric switch comprising relatively movable cooperating contacts, collapsible actuating means for effecting the circuit closing operation of said contacts comprising a toggle adapted to be released to effect the circuit opening operation of said contacts, and means for preventing the circuit closing operation of said contacts and the circuit opening operation thereof both by said actuating means and by shock comprising a member adapted to be operated to a position positively to hold the joint of said toggle against movement when said contacts are in the open circuit position and to another position positively to hold the joint of said toggle against movement when the contacts are in the circuit closing position.

14. An electric switch comprising relatively movable cooperating contacts, actuating means for effecting a circuit closing movement of said contacts comprising a collapsible mechanism adapted to be operated to effect a circuit opening operation of said contacts, and a movable member adapted to be operated to one position to prevent the actuation of said mechanism when said contacts are in the closed circuit position and to another position to prevent the actuation of said mechanism when the contacts are in the open circuit position.

15. An electric switch comprising relatively stationary and movable cooperating contacts, actuating means for moving said movable contact into engagement with said relatively stationary contact comprising a toggle mechanism, and means operative on said toggle mechanism positively to hold said movable contact against movement in consequence of both shock and an attempt to operate said actuating means while the movable contact is in the open circuit position.

16. An electric switch comprising relatively stationary and movable cooperating contacts, actuating means for moving said movable contact into engagement with said relatively stationary contact comprising a toggle mechanism adapted to be operated to effect the circuit opening movement of said movable contact, and means operative on said toggle mechanism positively to hold said movable contact against movement in consequence of both shock and an attempt to operate said actuating means while the movable contact is in the open circuit position and also while the movable contact is in the closed circuit position.

JAMES M. ANDERSON.